(12) United States Patent
Kashiwagi et al.

(10) Patent No.: US 7,835,618 B2
(45) Date of Patent: Nov. 16, 2010

(54) RECORDING APPARATUS, RECORDING METHOD, PROGRAM OF RECORDING METHOD, AND RECORDING MEDIUM HAVING PROGRAM OF RECORDING METHOD RECORDED THEREON

(75) Inventors: Shigeru Kashiwagi, Tokyo (JP); Masaharu Murakami, Tokyo (JP)

(73) Assignee: Sony Corporation (JP)

( * ) Notice: Subject to any disclaimer, the term of this patent is extended or adjusted under 35 U.S.C. 154(b) by 1161 days.

(21) Appl. No.: 11/485,027

(22) Filed: Jul. 12, 2006

(65) Prior Publication Data
US 2007/0058951 A1    Mar. 15, 2007

(30) Foreign Application Priority Data
Aug. 10, 2005    (JP)    .............................. 2005-231519

(51) Int. Cl.
*H04N 5/93* (2006.01)
*H04N 5/00* (2006.01)

(52) U.S. Cl. ........................................ 386/52; 386/125
(58) Field of Classification Search .................... 386/52, 386/46, 109, 111, 112, 55
See application file for complete search history.

(56) References Cited
U.S. PATENT DOCUMENTS
2002/0126224 A1* 9/2002 Lienhart ..................... 348/700

FOREIGN PATENT DOCUMENTS

| JP | 11-088874 A | 3/1999 |
|---|---|---|
| JP | 11259096 A | 9/1999 |
| JP | 2004-79087 A | 3/2004 |
| JP | 2005-108135 A | 4/2005 |
| JP | 2005108377 A | 4/2005 |
| JP | 2005196832 A | 7/2005 |

OTHER PUBLICATIONS

Office Action from Japanese Application No. 2005-231519, dated Mar. 23, 2010.

* cited by examiner

*Primary Examiner*—Robert Chevalier
(74) *Attorney, Agent, or Firm*—Lerner, David, Littenberg, Krumholz & Mentlik, LLP

(57) ABSTRACT

The present invention relates to a recording apparatus, a recording method, a program of the recording method, and a recording medium having the program of the recording method recorded thereon. The invention can be applied to a portable record/playback apparatus for recording video and audio data on a random access recording medium or the like in order to record a multiplexed stream in such a manner that the position of an editable boundary can be detected more quickly than previously possible. According to the invention, positional information on the editable point is recorded on the recording medium 2.

9 Claims, 5 Drawing Sheets

FIG. 2A
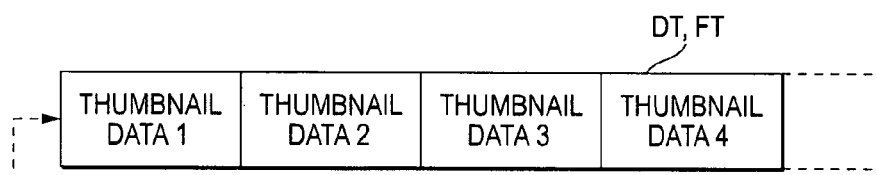
FIG. 2B
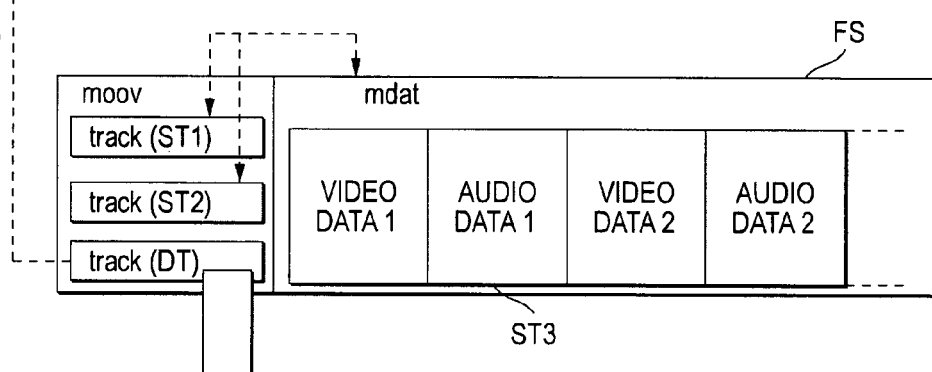
FIG. 2C
| No. | EDITABLE POINT OFFSET | EDITABLE POINT TIME | THUMBNAIL OFFSET |
|---|---|---|---|
| 1 | 0KB | 0 SECOND | 0KB |
| 2 | 512KB | 0.5 SECOND | 10KB |
| 3 | 1024KB | 1 SECOND | 19KB |

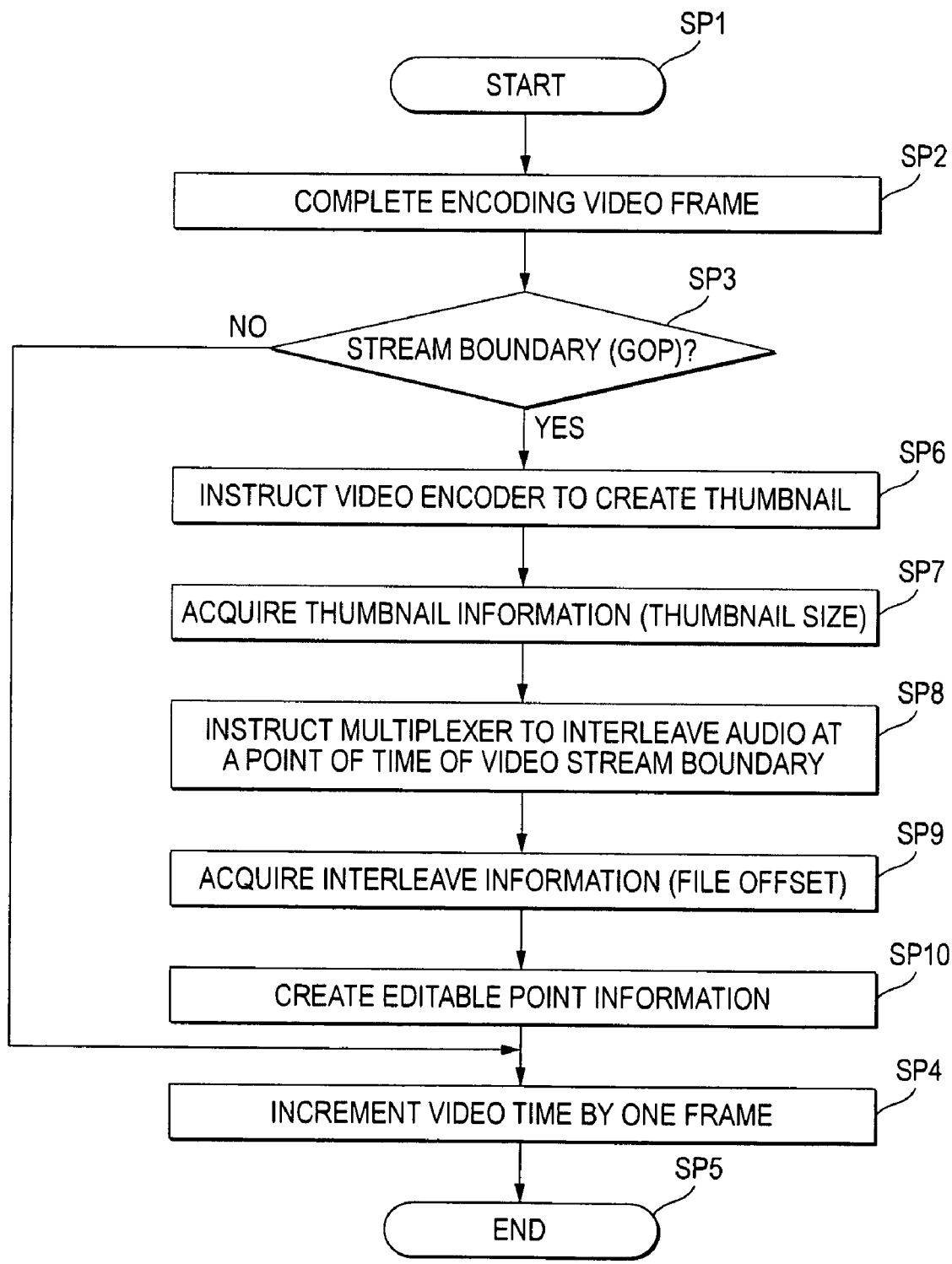

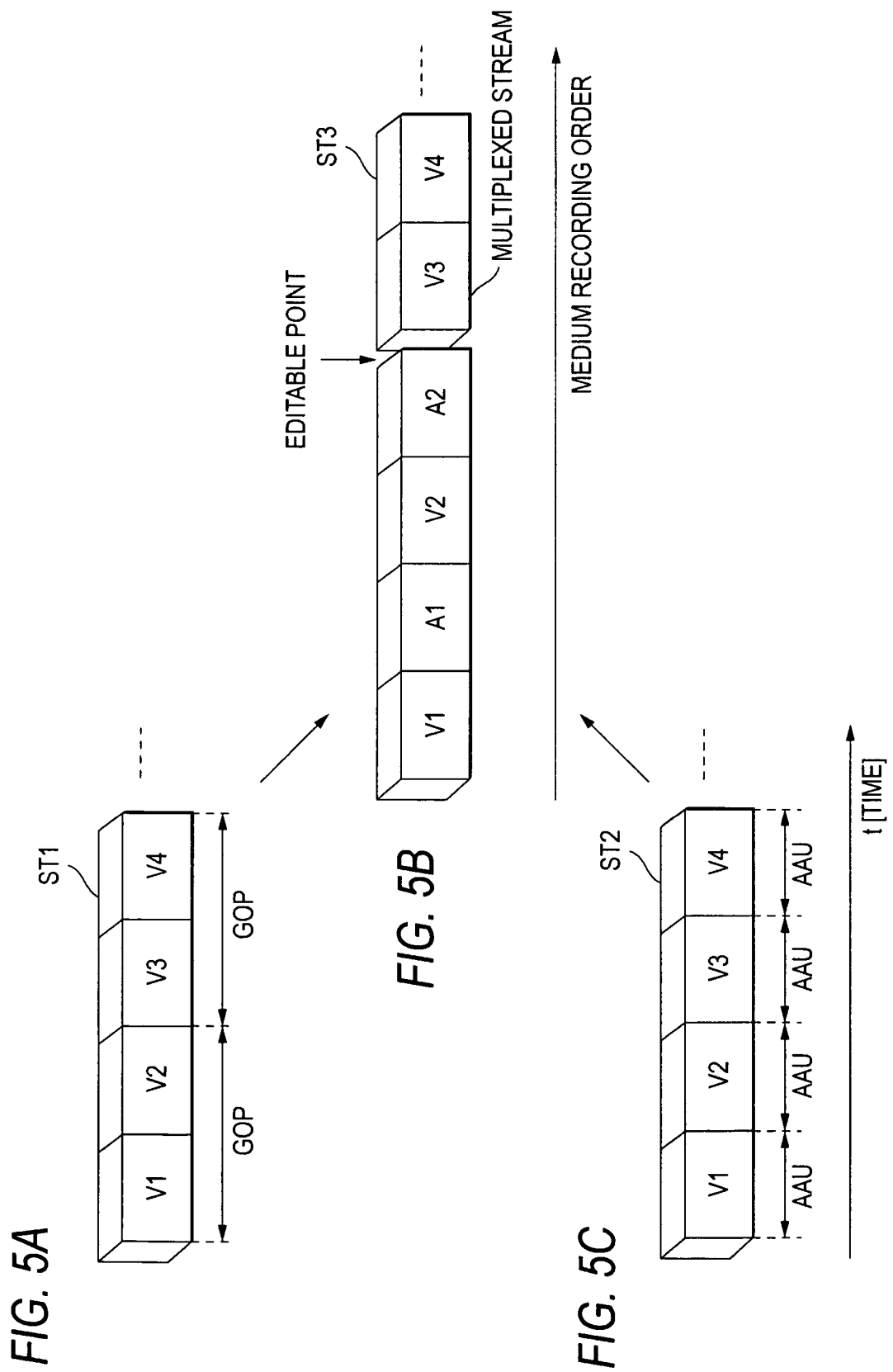

RECORDING APPARATUS, RECORDING METHOD, PROGRAM OF RECORDING METHOD, AND RECORDING MEDIUM HAVING PROGRAM OF RECORDING METHOD RECORDED THEREON

CROSS-REFERENCE TO RELATED APPLICATIONS

The present application claims priority from Japanese Patent Application No. JP 2005-231519 filed on Aug. 10, 2005, the disclosure of which is hereby incorporated by reference herein.

BACKGROUND OF THE INVENTION

1. Field of the Invention

The present invention relates to a recording apparatus, a recording method, a program of the recording method, and a recording medium having the program of the recording method recorded thereon. The invention is applicable to a portable record/playback apparatus for recording video and audio data on a random access recording medium or the like. The invention allows a multiplexed stream to be recorded in such a manner that the position of an editable boundary can be detected more quickly than previously possible by recording positional information on an editable point on the recording medium.

2. Description of the Related Art

In the past, for portable video camcorders and the like, video and audio data have been compressed in accordance with the MPEG (Moving Picture Experts Group) method, and interleaved and multiplexed for recording on a recording medium.

In the MPEG method, as shown in FIG. 4, consecutive frames are sequentially divided to form GOPs (Group Of Pictures) such that each GOP includes a predetermined number of frames and the first frame of each GOP is assigned as an I picture. In the MPEG method, the I picture is compressed by intra-frame coding. The remaining frames of the GOP are assigned as P and B pictures, which are compressed by inter-frame coding in which the I picture of the GOP is assigned as a prediction frame, as well as by another type of inter-frame coding in which a P picture that is coded by the I picture as a prediction frame is further assigned as a prediction frame. In this way, the video data is encoded on a GOP basis.

On the other hand, audio data is sequentially divided in accordance with the AAC (Advanced Audio Codec) method to form audio access units (AAU), as shown in FIG. 5C, such that each AAU is formed of a time section that corresponds to a GOP, and compressed on an audio access unit basis.

In video camcorders of related art, as shown in FIG. 5, streaming data ST1 of the video data and streaming data ST2 of the audio data thus compressed and created are each packeted using the predetermined time sections, and these packets are time multiplexed to form multiplexed stream ST3 by interleaving the streaming data ST1 of the video data and streaming data ST2 of the audio data. Thereafter, the multiplexed stream ST3 is recorded on a recording medium.

Since the streaming data ST1 of the video data in the MPEG format is compressed on a GOP basis, if a GOP is edited at some midpoint within the GOP and P and B pictures are separated from the I picture, where those I, P and B pictures as a whole form one GOP, it is difficult to decode these P and B pictures. Accordingly, the streaming data ST1 of the video data in the MPEG format needs to be edited at a boundary between GOPs.

Since streaming data ST2 of the audio data is also compressed on an audio access unit basis, if an audio access unit is edited at some midpoint within the audio access unit, it is difficult to decode the audio access unit. Accordingly, the streaming data ST2 of the audio data needs to be edited at a boundary between audio access units.

Accordingly, when the multiplexed stream ST3 recorded on the recording medium is edited, a point that is not only a boundary between GOPs but also a boundary between audio access units is where the multiplexed stream can be edited in such a manner that streaming data that form the multiplexed stream can be correctly decoded (hereinafter referred to as "editable point"). If the multiplexed stream is edited at a point other than editable points, at least one of the video data and audio data cannot be correctly decoded. Therefore, in video camcorders of the related art, a multiplexed stream recorded on the recording medium is edited by assigning a point that is not only a boundary between GOPs but also a boundary between audio access units as an editable point.

With regard to the recording of such multiplexed streams, JP-A-2004-79087 proposes a method in which the recording is carried out by setting the start of a GOP to the start of a cluster on a recording medium to allow quick editable point detection.

To detect such an editable point, it may be required to actually play back the multiplexed stream recorded on the recording medium, analyze the streaming data and detect a boundary. To divide a file formed of such a multiplexed stream, it may be required to detect such a boundary, taking into account the time elapsed from the start of the file. Furthermore, since the positional relationship between the interleaved video and audio data packets may be different depending on recording devices to be used, detection of a boundary also involves taking into account such a positional relationship between the packets.

Although the method disclosed in JP-A-2004-79087 can be thus applied to detect a multiplexed stream in order to reduce the time that may be required for boundary detection, the speed at which such an editable point is detected is still practically insufficient.

SUMMARY OF THE INVENTION

The invention has been made in view of the above situations and proposes a recording apparatus, a recording method, a program of the recording method, and a recording medium having the program of the recording method recorded thereon capable of recording a multiplexed stream in such a manner that the position of an editable boundary can be detected more quickly than previously possible.

According to a first embodiment of the invention, there is provided a recording apparatus that multiplexes a plurality of streaming data to create a multiplexed stream and records the multiplexed stream on a recording medium. The recording apparatus includes a detector that detects a boundary of a data compression processing unit of the streaming data; a multiplexer that, based on the detection result of the detector, creates the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and a recorder that records the multiplexed stream and management information on the multiplexed stream derived from positional and temporal information on the editable point in the multiplexed stream on the recording medium.

According to a second embodiment of the invention, there is provided a recording method for multiplexing a plurality of streaming data to create a multiplexed stream and recording the multiplexed stream on a recording medium. The recording method includes the steps of: detecting a boundary of a data compression processing unit of the streaming data; based on the detection result of the detecting step, creating the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and recording the multiplexed stream and management information on the multiplexed stream derived from positional and temporal information on the editable point in the multiplexed stream on the recording medium.

According to a third embodiment of the invention, there is provided a program of a recording method for multiplexing a plurality of streaming data to create a multiplexed stream and recording the multiplexed stream on a recording medium by carrying out a predetermined processing procedure using an operation processor. The processing procedure includes the steps of: detecting a boundary of a data compression processing unit of the streaming data; based on the detection result of the detecting step, creating the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and recording the multiplexed stream and management information on the multiplexed stream derived from positional and temporal information on an editable point in the multiplexed stream on the recording medium.

According to a fourth embodiment of the invention, there is provided a recording medium having a program of a recording method recorded thereon. On the recording medium is recorded the program of the recording method according to the third embodiment.

According to the configuration of the first embodiment, since the recording apparatus that multiplexes a plurality of streaming data to create a multiplexed stream and records the multiplexed stream on a recording medium includes a detector that detects a boundary of a data compression processing unit of the streaming data; a multiplexer that, based on the detection result of the detector, creates the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and a recorder that records the multiplexed stream and management information on the multiplexed stream derived from positional and temporal information on the editable point in the multiplexed stream on the recording medium, the editable point of the multiplexed stream recorded on the recording medium can be detected using the positional and temporal information allocated to the management information without having to play back and analyze the multiplexed stream, allowing the multiplexed stream to be recorded in such a manner that the position of the editable boundary can be detected more quickly than previously possible.

According to the configurations of the second, third and fourth embodiments, there are provided a recording method, a program of the recording method, and a recording medium having the program of the recording method recorded thereon capable of recording a multiplexed stream in such a manner that the position of an editable boundary can be detected more quickly than previously possible.

According to the invention, a multiplexed stream can be recorded in such a manner that the position of an editable boundary can be detected more quickly than previously possible.

BRIEF DESCRIPTION OF THE DRAWINGS

FIG. 2 shows views and a table for explaining a recording format used in the record/playback apparatus of FIG. 1;

FIG. 3 is a flowchart showing a processing procedure carried out in a controller in the record/playback apparatus of FIG. 1;

FIG. 5 shows schematic diagrams for explaining a multiplexing process.

DETAILED DESCRIPTION

Embodiments of the invention will be described in detail below with reference to the drawings as appropriate.

Embodiment 1

(1) Configuration of the Embodiment

Figure 1:
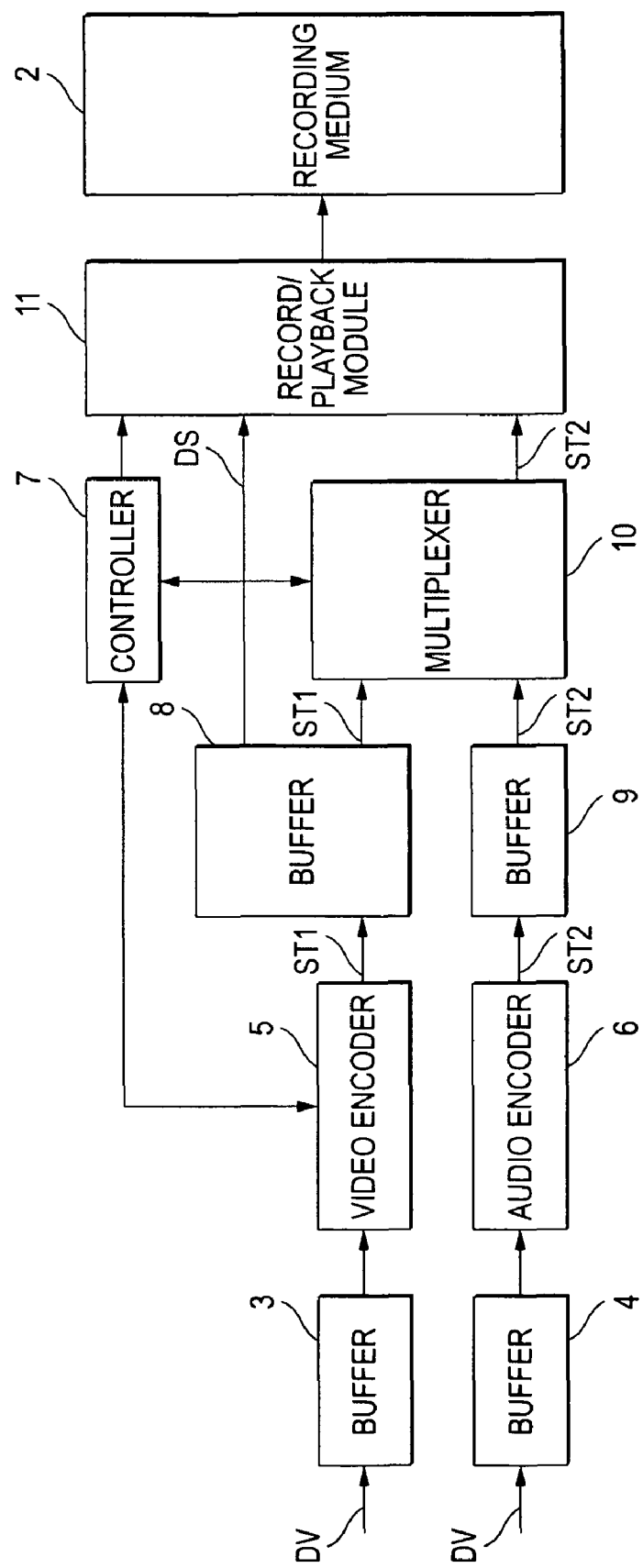
FIG. 1 is a block diagram showing a record/playback apparatus according to an embodiment of the invention.
Figure 4:
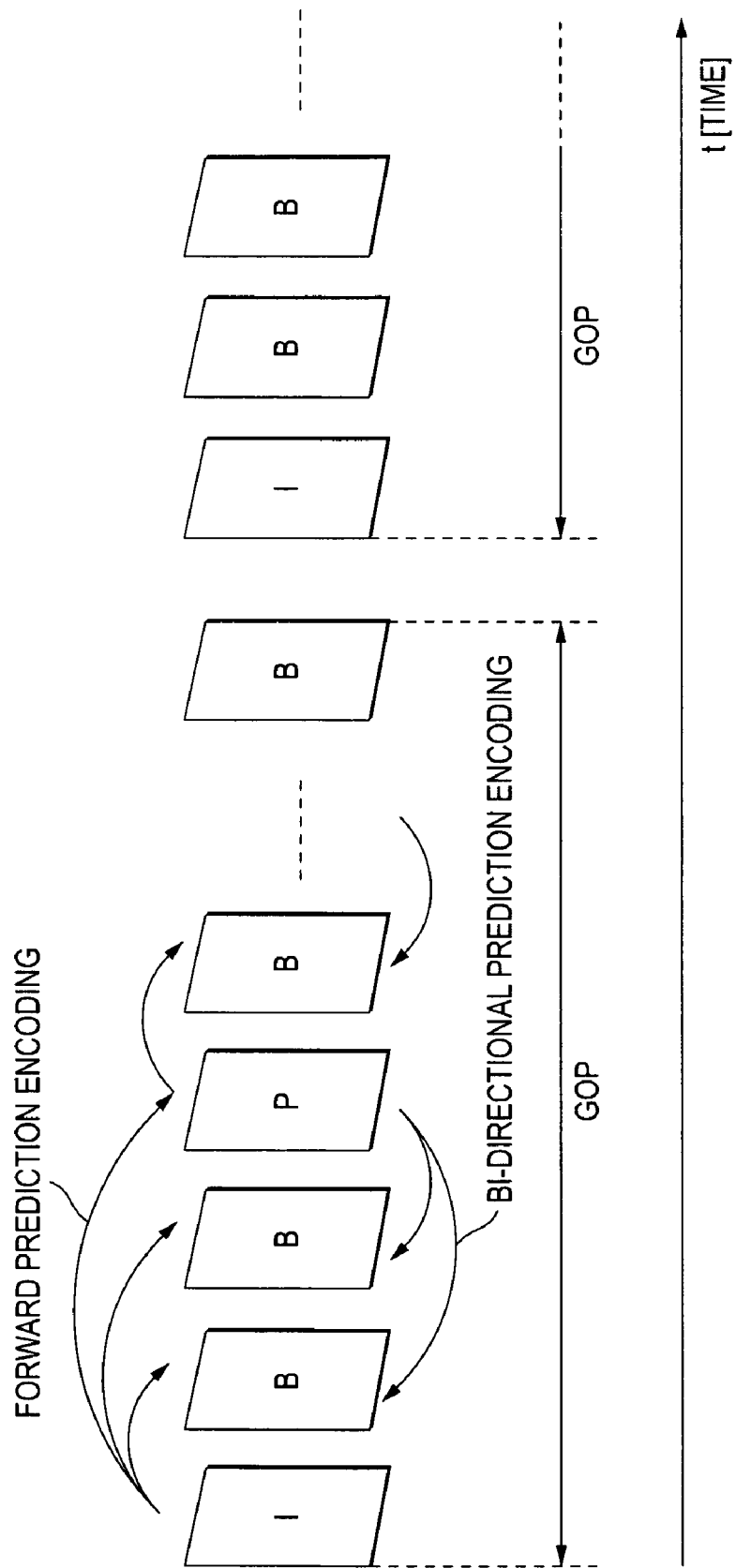
FIG. 4 is a schematic diagram for explaining a video data coding process.

FIG. 1 is a block diagram of the record/playback apparatus according to the embodiment of the invention. The record/playback apparatus 1 is a portable video camcorder. It records video and audio data obtained by imaging a desired object on a recording medium 2 and plays back the video and audio data recorded on the recording medium 2 as an output. To this end, the record/playback apparatus 1 processes one-channel video data DV supplied from an imaging element and one-channel stereo audio data DA supplied from a microphone in respective signal processing circuits, and inputs the resultant signals to a video encoder 5 and an audio encoder 6 through buffer memories (buffers) 3 and 4. In this embodiment, the recording medium 2 is a random access recording medium, such as an optical disc or memory card.

The video encoder 5 compresses the sequentially inputted video data DV in the MPEG format and outputs streaming data ST1 derived from the video data. In this process, the video encoder 5, when it completes the encoding associated with an I picture, under the control of a controller 7, thins out pixels that form the I picture and creates thumbnail image data DT of the I picture as an output.

The audio encoder 6 compresses the sequentially inputted audio data DA in the AAC format and outputs streaming data ST2 derived from the audio data.

A buffer memory (buffer) 8 accumulates the streaming data ST1 derived from the video data and the thumbnail image data DT outputted from the video encoder 5 and outputs them. A buffer memory (buffer) 9 accumulates the streaming data ST2 derived from the audio data outputted from the audio encoder 6 and outputs it. While the buffer memories 8 and 9 temporarily thus store the streaming data ST1 and ST2 and output them, the timing of the streaming data ST2 derived from the audio data is corrected such that the timing of a GOP boundary of the streaming data ST1 derived from the video data and the timing of an audio access unit boundary of the streaming data ST2 derived from the audio data coincide under the control of the controller 7 that monitors control codes set in the sequentially inputted streaming data ST1 and ST2 and controls the timing based on the result of the monitoring, and the resultant streaming data ST2 derived from the audio data is synchronized with the streaming data ST1 derived from the video data as an output. Thus, in this embodiment, the controller 7 forms a detector that detects a boundary between data compression processing units of the streaming data associated with the video and audio data.

A multiplexer 10 interleaves, under the control of controller 7, the streaming data ST1 and ST2 outputted from the buffer memories 8 and 9 to produce a multiplexed stream ST3 and outputs it (see FIG. 5). In this way, the record/play back apparatus 1 encodes each of the video data DV and audio data DA on a data compression processing unit basis, that is, on a GOP or audio access unit basis, multiplexes the resultant streaming data ST1 and ST2 and outputs them.

In this interleaving process, the multiplexer 10 produces the multiplexed stream by interleaving, under the control of controller 7, the streaming data ST1 and ST2 in a fixed time section such that there are provided an editable point at which the multiplexed stream can be edited in such a manner that the plurality of streaming data ST1 and ST2 can be correctly decoded and the plurality of streaming data ST1 and ST2 are interleaved at least at a boundary thereof.

Specifically, in this embodiment, by inputting the streaming data ST1 derived from video data and the streaming data ST2 derived from the audio data from the buffer memories 8 and 9 such that the start of a GOP of the streaming data ST1 and the start of an audio access unit of the streaming data ST2 coincide, and interleaving the streaming data ST1 and ST2 in the fixed time section that is arranged such that the timing of the GOP boundary coincides with the timing of the interleaving, the multiplexed stream ST3 can be produced such that the boundary of the streaming data ST1 of the video data and the boundary of the streaming data ST2 of the audio data are created in succession on the multiplexed stream ST3. In this case, the last boundary of these continuous boundaries can be an editable point.

A record/playback module 11 records, under the control of controller 7, the multiplexed stream ST3 outputted from the multiplexer 10, the thumbnail image data DT outputted from the buffer memory 8 and the like on the recording medium. In this embodiment, the MP4 file format (ISO/IEC 14496-14) is used to record the multiplexed stream ST3 and the thumbnail image data DT on the recording medium 2 in the forms of a streaming data file and thumbnail data file, respectively.

The MP4 file format is an ISO standard, multimedia-capable file format based on the Quick Time file format.

In the MP4 file format, several types of actual data, such as video images, still images and audio data, are bundled into a block, and several types of management information for managing the actual data are bundled into a block that is different from the actual data block. In the MP4 file format, as shown in FIG. 2B, the actual data block is referred to as a medium data box (mdat) and the management information block is referred to as a movie box (moov). Several types of management information in the forms of hierarchically structured blocks are allocated in the movie box (moov) and each of these blocks is also referred to as a box.

In the MP4 file format, a track box (track) is created under the movie box (moov) hierarchy for each kind of actual data associated with the MP4 file format. Consequently, when the streaming data and thumbnail images of the video and audio data are recorded, three track boxes (tracks) for video, audio and thumbnail are created in the movie box (moov) of the MP4 file.

Thus, as shown in FIGS. 2A and 2B, the record/playback module 11 sequentially records the thumbnail image data DT and allocates the management information to the track box (track) in the movie box (moov) using an external reference function to create thumbnail data files FT and FS. The management information in the track box (track) is necessary to play back each of the thumbnail image data DT and is allocated with various data, such as positional information, data length and temporal information on an editable point of each of the thumbnail image data DT in the thumbnail data file FT.

At the same time, the record/playback module 11, as shown in FIG. 2B, sequentially records the multiplexed streams ST3 in the medium data box (mdat) and allocates the management information to the video and audio track boxes (tracks) in the movie box (moov) to create a streaming data file FS. From the management information in each of the tracks in the movie box (moov), the offset data position of an editable point with reference to the recording start position of the multiplexed stream ST3 and the playback time measured from the recording start position are determined, as shown in FIG. 2C. These enable quick search of an editable point and quick display of the thumbnail.

The controller 7 includes an operation processor that controls the operations of the entire record/playback apparatus 1 by carrying out a program recorded in a memory (not shown). When the user instructs the controller 7 to record acquired images, it switches the operation mode of the entire record/playback module 1 and initiates acquisition and recording of the video data DV and the audio data DA. When recording the video data DV and the audio data DA, the controller 7 carries out the processing procedure shown in FIG. 3 for each frame of the video data DV to record the thumbnail data file FT and the streaming data file FS in the above-mentioned MP4 file format on the recording medium 2. In this embodiment, the program executed by the controller 7 is preinstalled in the record/playback apparatus 1. However, the program may be instead downloaded over a network such as the Internet, or may be provided through a recording medium, such as an optical disc, magnetic disc, or memory card.

Specifically, the controller 7, upon the start of the processing procedure, proceeds from step SP1 to step SP2 where it waits until one frame is encoded. In the subsequent step SP3, the controller 7 determines whether or not the encoded frame is an I picture to determine whether or not one frame following a GOP boundary is encoded. Although the determination is based on the picture type supplied from the control code set in the streaming data ST1, it may be instead based on notification of the picture type from the video encoder 5. If the result is NO, the controller 7 proceeds from step SP3 to step SP4 where the controller 7 increments offset values by one frame that underwent this process, the offset values indicative of the playback time from the start of the file and the recording position of the start of the frame, and then proceeds to step SP5 to complete this processing procedure. To increment the offset value indicative of the recording position, the amount of data corresponding to one frame of the streaming data outputted from the video encoder 5 is added to the current offset value.

In contrast, when the result of step SP3 is YES, the controller 7 proceeds to step SP6 where the controller 7 instructs the video encoder 5 to create thumbnail image data DT, and then a thumbnail image of the I picture is created. In the subsequent step SP7, by detecting the amount of data of the thumbnail image data DT created in the video encoder 5, the size of the thumbnail image data DT is detected. In the subsequent step SP8, the controller 7 instructs to perform interleaving at the editable point associated with the start point of the I picture. In the subsequent step SP9, the incremented value and the playback time last obtained in step SP4 are acquired, and the offset values and temporal information of the editable point are thereby detected. In the subsequent step SP10, from the amount of the data acquired in step SP7 and the offset values and temporal information acquired in step SP9, various types of information on the editable point described above with reference to FIG. 2B are created and notified to the record/playback module 11, and the controller 7 proceeds to step 4.

In this way, the controller 7 creates the thumbnail image data DT to record the thumbnail data file FT on the recording medium 2 while sequentially recording streaming data files FS derived from multiplexed streams ST3.

When the user instructs the controller 7 to stop the recording, the controller 7 stops the processing sequence to terminate the recording of the streaming data file FS and the thumbnail data file FT. On the other hand, when the user instructs the controller 7 to play back a file recorded on the recording medium 2, the controller 7 controls the entire operation to play back the streaming data file FS that the record/playback module 11 instructs to play back. The multiplexed stream ST3 thus supplied from the record/playback module 11 is split into the streaming data of video and audio data, each of which is then decoded and provided to the user.

In this operation sequence, when the playback instruction from the user involves editing, the controller 7 reproduces the track box associated with the thumbnail data file FT and recorded in the streaming data file FS, holds the reproduced data in a built-in memory, sequentially plays back thumbnail images from the thumbnail image data DT recorded in the thumbnail data file FT with the aid of the data of the track box recorded in the memory, and displays the thumbnail images on the monitor at a fixed time interval. The controller 7 stops the playback of such thumbnail images at a fixed time interval in response to a user's operation through an operation module and becomes ready to accept any user's operation. In this way, the controller 7 accepts, for example, an instruction to delete the portion that the user has accidentally recorded by a user's unintended recording operation through the operation module. When the controller 7 accepts the user's instruction such as deleting, the controller 7 searches the track box of the multiplexed stream for a corresponding editable point with the aid of the record of the track box of the temporarily stopped and displayed thumbnail images, and edits the streaming data file FS using the editable point. In the editing process, the user may utilize the characteristics of a MP4 file to create a movie box in the external reference form, for example, from the track box in which the portion after the editable point has been deleted, and then create another file including the result of the editing. The thumbnail data file FT may be used not only for such editing but also for random accessing.

(2) Operation of the Embodiment

In the record/playback apparatus 1 thus configured, video data DV supplied from the imaging element is inputted to the video encoder 5 through the buffer memory 3 and compressed in the MPEG format on a GOP-based data compression processing unit basis to create streaming data ST1 derived from the video data. On the other hand, audio data DA supplied from the microphone is inputted to the audio encoder 6 through the buffer memory 4 and compressed in the AAC format on an audio access unit-based data compression processing unit basis to create streaming data ST2 derived from the audio data.

The streaming data ST1 derived from the video data and the streaming data ST2 derived from the audio data undergo the detection process performed by the controller 7 to detect respective boundaries between the data compression processing units. To create the multiplexed stream ST3, the streaming data ST1 and ST2 are interleaved in a fixed time section containing at least the boundaries of the streaming data ST1 and ST2 such that there is provided an editable point not only by the controller 7 that controls the timing of the buffer memories 8 and 9 based on the above detection result but also by the multiplexer 10 that controls the timing of the interleaving. Thus, in the process of the video and audio data, when the multiplexed stream ST3 undergoes an editing process using the editable point, both the video and audio data are arranged such that they can be correctly decoded, and are converted into the multiplexed stream ST3, which is recorded on the recording medium 2 in the record/playback apparatus 1.

In the record/playback apparatus 1, positional and temporal information on the editable point in the multiplexed stream is created in the controller 7 and recorded on the recording medium 2 as the management information on the multiplexed stream. Thus, the editable point of the multiplexed stream ST3 recorded on the recording medium 2 can be detected using the positional and temporal information of the editable point recorded on the recording medium without having to play back and analyze the streaming data ST1 and ST2 of the video and audio data, allowing the multiplexed stream to be recorded in such a manner that the position of the editable boundary can be detected more quickly than previously possible.

Specifically, in the record/playback apparatus 1, the streaming data ST1 of the video data and the streaming data ST2 of the audio data are arranged such that the timing of a GOP boundary and the timing of an audio access unit coincide by controlling the timing of the buffer memories 8 and 9, and then interleaved in a fixed time section containing the timing of the GOP boundary. Consequently, the boundaries of the streaming data ST1 and ST2 are formed in succession on the multiplexed stream, and the last boundary of these continuous boundaries on the multiplexed stream can be an editable point.

Thus, in this embodiment, the positional and temporal information associated with the last boundary is recorded on the recording medium 2 as the management information, and the position of the editable boundary can be quickly detected using the positional and temporal information to process the multiplexed stream recorded on the recording medium 2.

Furthermore, in this embodiment, while the multiplexed stream ST3 thus created is recorded on the recording medium 2, thumbnail image data DT of an I picture is created when the video data DV is encoded in the video encoder 5 and the thumbnail image data DT is also recorded on the recording medium 2. In this way, in the record/playback apparatus 1, the thumbnail image of one frame that follows the editable point derived from the positional and temporal information recorded on the recording medium 2 is also recorded on the recording medium 2.

Therefore, in the record/playback apparatus 1, by playing back and displaying the thumbnail image data DT recorded on the recording medium 2, the editable point can be easily and quickly confirmed, providing improved workability in an editing process accordingly and hence improved user friendliness.

The multiplexed stream ST3 is recorded on the recording medium 2 in the form of a file and the positional information on the editable point is recorded on the recording medium in the form of the offset from the start of the file. Thus, the positional information can be used to quickly access the portion associated with the desired editable point in the file of the multiplexed stream ST3 recorded on the recording medium 2, also providing improved user friendliness. The temporal information is also recorded in the form of playback time with reference to the start of the file, also providing improved workability in the editing process.

Accordingly, in this embodiment, the thumbnail image data is recorded on the recording medium 2 in the MP4 file format, and the multiplexed stream ST3 is recorded in the MP4 file format that externally refers the MP4 file of the thumbnail image data. Thus, the thumbnail image of the multiplexed stream ST3 recorded on the recording medium can be played back either by the MP4 file of the thumbnail image data or by the MP4 file of the multiplexed stream ST3, thereby reducing the burden on the playback processing side accordingly.

(3) Advantages of the Embodiment

According to the above configuration, by recording positional information on an editable point on a recording medium, multiplexed stream can be recorded in such a manner that the position of the editable boundary can be detected more quickly than previously possible.

By interleaving a plurality of streaming data in such a manner that boundaries of the plurality of the streaming data are arranged in succession on a multiplexed stream and recording positional information on the last boundary of the continuous boundaries as an editable point on a recording medium, the multiplexed stream can be recorded in such a manner that the position of the editable boundary can be detected more quickly than previously possible.

Specifically, when at least one streaming data of the plurality of streaming data is audio data compressed in the AAC format and the boundary of this streaming data is an audio access unit boundary, a multiplexed stream derived from the audio data compressed in the AAC format can be recorded in such a manner that the position of the editable boundary can be detected more quickly than previously possible.

Similarly, when at least one streaming data of the plurality of streaming data is video data compressed in the MPEG format and the boundary of this one streaming data is a GOP boundary, a multiplexed stream derived from the video data compressed in the MPEG format can be recorded in such a manner that the position of the editable boundary can be detected more quickly than previously possible.

By creating thumbnail image data from an I picture of the video data and recording the thumbnail image data on the recording medium, workability in an editing process can be improved to provide improved user friendliness.

When recording the multiplexed stream in the form of a file on the recording medium, by recording the positional information on the editable point in the form of the offset with reference to the start of the file, workability in the editing process is also improved to provide improved user friendliness.

When recording a thumbnail image file derived from continuous thumbnail image data on the recording medium, by recording the multiplexed stream in the form of a file in such a manner that the thumbnail image file can be externally referenced and played back, the thumbnail images can be confirmed by playing back either the thumbnail image data file or the multiplexed stream file, thereby reducing the burden on the playback processing side accordingly.

Embodiment 2

In the above embodiment, although the description is based on the case where the thumbnail image data can be played back by external referencing and playing back the multiplexed stream, the invention is not limited thereto but the multiplexed stream and thumbnail image data may be integrated into a file in a self-contained form for recording.

In the above embodiment, although the description is based on the case where the thumbnail image data and multiplexed stream are recorded in the MP4 file format, the invention is not limited thereto but may be applied to a variety of cases where the thumbnail image data and multiplexed stream are recorded in various file formats.

In the above embodiment, although the description is based on the case where the editable boundary of streaming data of video data is a GOP, the invention is not limited thereto but may be applied to the case where the editable boundary is a closed GOP.

In the above embodiment, although the description is based on the case where streaming data derived from one-channel video data and streaming data derived from one-channel stereo audio data are interleaved and multiplexed, the invention is not limited thereto but may be applied to a variety of cases where streaming data associated with video and audio data from various numbers of channels are multiplexed and recorded.

In the above embodiment, although the description is based on the case where the invention is applied to a portable video camcorder, the invention is not limited thereto but may be applied to a variety of processes where various types of desktop record/playback apparatuses, personal computers and the like are involved.

The invention relates to a recording apparatus, a recording method, a program of the recording method, and a recording medium having the program of the recording method recorded thereon. The invention can be applied to a portable record/playback apparatus for recording video and audio data on a random access recording medium or the like.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording apparatus that multiplexes a plurality of streaming data to create a multiplexed stream and records the multiplexed stream on a recording medium, apparatus comprising:
    a detector that detects a boundary of a data compression processing unit of the streaming data;
    a multiplexer that, based on the detection result of the detector, creates the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and
    a recorder that records the multiplexed stream and management information on the multiplexed stream on the recording medium, in which the management information includes information representative of positional information and temporal information on the editable point in the multiplexed stream.

2. The recording apparatus according to claim 1, wherein the multiplexer interleaves the plurality of streaming data in such a manner that the boundaries of the plurality of the streaming data are arranged in succession on the multiplexed stream to provide an editable point, the editable point being the last boundary of the continuous boundaries.

3. The recording apparatus according to claim 1 wherein at least one streaming data of the plurality of streaming data is audio data compressed in the AAC format and the boundary of the one streaming data is an audio access unit boundary.

4. The recording apparatus according to claim 1, wherein at least one streaming data of the plurality of streaming data is video data compressed in the MPEG format and the boundary of the one streaming data is a GOP boundary.

5. The recording apparatus according to claim 4, further comprising thumbnail image generator that generates thumbnail image data from an I picture of the video data, wherein the recorder records the thumbnail image data on the recording medium.

6. The recording apparatus according to claim 1, wherein the recorder records the multiplexed stream in the form of a file on the recording medium, and records the positional information on the editable point in the form of the offset with reference to the start of the file.

7. The recording apparatus according to claim 5, wherein the recorder records the thumbnail image data in the form of a thumbnail image file derived from the continuous thumbnail image data, and records the multiplexed stream in the form of a file in such a manner that the thumbnail image file can be externally referenced and played back.

8. A recording method for multiplexing a plurality of streaming data to create a multiplexed stream and recording the multiplexed stream on a recording medium, the method comprising the steps of:
   detecting a boundary of a data compression processing unit of the streaming data;
   based on the detection result of the detecting step, creating the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and
   recording the multiplexed stream and management information on the multiplexed stream on the recording medium, in which the management information includes information representative of positional information and temporal information on the editable point in the multiplexed stream.

9. A recording medium having stored thereon a program of a recording method for multiplexing a plurality of streaming data to create a multiplexed stream and recording the multiplexed stream on a recording medium by carrying out a predetermined processing procedure using an operation processor, the processing procedure comprising the steps of:
   detecting a boundary of a data compression processing unit of the streaming data;
   based on the detection result of the detecting step, creating the multiplexed stream from the plurality of the streaming data by interleaving the plurality of the streaming data at least at the boundary of the plurality of the streaming data such that there is provided an editable point at which the multiplexed stream can be edited in such a manner that the plurality of streaming data can be correctly decoded; and
   recording the multiplexed stream and management information on the multiplexed stream on the recording medium, in which the management information includes information representative of positional information and temporal information on an editable point in the multiplexed stream.

* * * * *